United States Patent [19]

Vermilyea et al.

[11] 4,207,348
[45] Jun. 10, 1980

[54] FOOD ITEM AND METHOD OF PREPARATION

[75] Inventors: Barry L. Vermilyea, Brooklyn Park; Fred W. Crossen, Jr.; Douglas D. Mohar, both of Maple Grove, all of Minn.

[73] Assignee: International Multifoods Corporation, Minneapolis, Minn.

[21] Appl. No.: 971,733

[22] Filed: Dec. 21, 1978

[51] Int. Cl.² ............................................. B65B 25/22
[52] U.S. Cl. ..................................... 426/95; 426/100; 426/107; 426/234; 426/243; 426/293; 426/412; 426/444
[58] Field of Search ................ 426/94, 107, 113, 234, 426/243, 392, 412, 95, 100, 549, 393, 444

[56] References Cited

U.S. PATENT DOCUMENTS

| 3,189,463 | 6/1965 | Jones .................... 426/95 X |
| 3,475,182 | 10/1969 | Goodman et al. ............... 426/107 X |
| 3,479,188 | 11/1969 | Thelen ..................... 426/243 X |
| 3,532,510 | 10/1970 | Zimmerman ..................... 426/94 X |
| 3,539,354 | 11/1970 | Colvin . |
| 3,719,138 | 3/1973 | Blaetz et al. . |
| 4,015,085 | 3/1977 | Woods ........................... 426/107 X |
| 4,020,188 | 4/1977 | Forkner .......................... 426/95 |

FOREIGN PATENT DOCUMENTS 61954  5/1975  Australia .................................... 426/94

*Primary Examiner*—Robert L. Lindsay, Jr.
*Attorney, Agent, or Firm*—Merchant, Gould, Smith, Edell, Welter & Schmidt

[57] ABSTRACT

A sandwich-like food item with a high tolerance for microwave heating is provided by inserting a pre-frozen layer of interior filling material into a dough envelope made from a suitable bread mix, water, and yeast; and then proofing and baking the thus-assembled sandwich-like item. The formulation or selection of the dough, the total enveloping of the filling, and the cold state of the filling during proofing and baking may all contribute to the resistance to adverse effects from microwave heating.

13 Claims, No Drawings

FOOD ITEM AND METHOD OF PREPARATION

TECHNICAL FIELD

This invention relates to sandwich-like convenience foods and methods for making them. An aspect of this invention relates to a method for making a sandwich-like convenience food which is particularly well suited to being frozen and then either thawed and brought to moderately elevated temperatures or simply heated with microwave energy. Still another aspect of this invention relates to a method for making a convenience food which, when cooked with microwave energy, is not excessively dehydrated, toughened, or rendered unpalatable.

BACKGROUND OF THE PRIOR ART

Not long after large-scale, effective means for generating microwave energy were discovered (e.g. the discovery of the magnetron in the 1930's), it became apparent that such ample sources of microwave energy in the very high and ultrahigh frequency ranges could be employed in food technology, e.g. for rapid cooking of various foods. Frequencies in the megahertz range (e.g. above 800 megahertz) were found to be extremely effective in raising the temperature of foods, particularly when the food material contained substances such as water which are good absorbers of microwave energy. So-called microwave ovens have been in use for various cooking and thawing operation for many years.

One of the economically important applications of microwave heating technology involves the so-called "reconstitution" of frozen convenience foods, e.g. snack food items. Theoretically, conventional heating ovens can be dispensed with entirely in small restaurant operations, wherein food is stored in a frozen or refrigerated state for subsequent heating and consumption. Not only can the frozen or refrigerated food items by thawed very quickly, they can also, either in a plurality of operations or in the same operation, be brought to moderately elevated temperatures on a short-order basis.

Such short-order thawing and heating techniques are not equally effective for all foods, however. Some foods, particularly sandwiches are subject to undesirable changes in moisture content during the microwave "reconstitution" process. For example, excessive loss of moisture during thawing and/or heating of bread components can render them rubbery or leathery and hence less palatable. Both the texture and the taste of bread components and sandwich filling materials can be affected adversely by microwave "reconstitution".

Somewhat similar problems may be encountered in any fast cooking or heating or thawing process, e.g. with infrared heating and conventional hot air ovens. At the present time, the problems appear to be particularly acute when microwave energy is used for thawing or heating. There are great advantages in being able to heat frozen sandwich-type items directly from a cold state to provide hot snack items such as hamburgers, grilled cheese sandwiches, hot beef sandwiches, and the like. If the price to be paid for such advantages is a sandwich-like item which is distasteful, leathery, unduly moist, or otherwise unlike hot sandwiches prepared in a more conventional manner, the likelihood of realizing these advantages on a large commercial scale remains relatively remote.

It has been suggested that the effects of microwave heating can be controlled by special packaging of sandwich items. For example, U.S. Pat. No. 4,015,085 (Woods), issued Mar. 29, 1977 discloses a sandwich having a moisture containing bread base and a filler on top of the base enclosed in a non-metallic film, provided with means within the enclosure for controlling the effects of heating directly from the frozen state. The particular means for controlling these effects is a conductive layer between the bottom of the bread base and the non-metallic film. A moisture absorbent layer may also be included in the enclosure. The apparent purpose of the conductive layer is to redistribute the heat energy within the enclosure, partially shielding the bread base from heat while permitting full exposure of the sandwich filling material to heat. Microwave heating of the thus-packaged sandwich item is specifically contemplated.

Both frozen and non-frozen sandwich items and other filled foods items have received a considerable amount of attention in the U.S. patent literature. The following references are believed to be representative of the prior art in this specific field.

| U.S. Pat. No. | Patentee | Issue Date |
| --- | --- | --- |
| 3,189,463 | Jones | June 15, 1965 |
| 3,475,182 | Goodman et al | October 28, 1969 |
| 3,532,510 | Zimmerman | October 6, 1970 |
| 3,539,354 | Colvin | November 10, 1970 |
| 3,719,138 | Blaetz et al | March 6, 1973 |

Of the foregoing references, the Zimmerman patent appears to be of interest for its disclosure of a filling which can be completely enclosed on all sides by a dough material.

SUMMARY OF THE INVENTION

It has now been discovered that a sandwich-like convenience food particularly well suited to resisting the adverse effects of microwave heating can be prepared by:

(a) forming a dough sheet at normal ambient temperatures;

(b) freezing a pre-sized layer of interior filling material to a temperature below 0° C.;

(c) inserting the pre-sized, frozen layer in an envelope made from the dough sheet (or a plurality of dough sheets); and (d) proofing and baking the resulting assembled, sandwich-like convenience food item.

The resulting sandwich-like convenience food can be frozen, shipped to a food store or the ultimate user, stored in a frozen or refrigerated state, and, if desired, "reconstituted" by microwave energy directly from the frozen or refrigerated state. Although this invention is not bound by any theory, it is believed that many of the advantages of the above-described method stem from providing an interior filling material which is in the frozen state when the proofing and baking step or steps begin. Not only does such use of a frozen filling material permit greater flexibility in the choice of fillings and greater production efficiency (because improved ease of material handling and greater integrity and dimensional stability of the filling), it also helps to avoid overcooking of the filling. Experience with the practice of this invention suggests that any excessive heating of the filling material during proofing and baking of the dough envelope adversely affects the quality of the food item, particularly at the time when it is reconstituted with microwave energy, but in some cases even prior to that time. The greater flexibility in selection of interior fillings stems in part from the fact that fillings, such as caserole-like or salad-like mixtures of meats or cheeses or vegetables with sauces or dressing, which have little or no solidity or dimensional stability at normal ambient temperatures can, when frozen, be solids with well-defined dimensions.

The dough used to make the dough envelope can be selected for resistance to adverse effects of microwave heating. A typical preferred dough is formulated from high protein flour, dough conditioners and an emulsified lipid system.

A food item prepared according to this invention is essentially a sealed unit resembling a "pasty" instead of a sandwich, the sealing function being provided by the bread-like envelope. To the consumer, the sealed unit can resemble, in its taste and texture, a sandwich (e.g. a hamburger, grilled cheese sandwich, ham and cheese sandwich, or the like) instead of the usual bakery goods type of "pasty".

DETAILED DESCRIPTION

An important aspect of this invention is the selection of suitable ingredients for the sandwich-like food item, particularly the dough which is used to form the envelope around the sandwich filling. By contrast, much greater flexibility can be exercised in selecting suitable interior fillings. The preferred interior fillings include meats (ground beef, ham, etc.), cheeses, various combinations of meats and cheeses, and various combinations of all of these with dressings, sauses, chopped vegetables, coatings, flavorings, etc. (e.g. spices, tomato sauce or the like). As noted previously, the filling need not have structural integrity at temperatures above 15° to 20° C., so long as it can be frozen to a solid. The preferred method for preparing interior fillings will be discussed subsequently.

As noted previously, some of the tolerance for microwave reconstitution possessed by sandwich-like items of this invention is attributable to the properties of the baked dough envelope. The basic ingredients for the dough include a type of French bread mix. The dough for the envelope is prepared by blending the French bread mix with water and yeast. The proportions of bread mix, water, and yeast are generally conventional, e.g. 25–100 parts per 100 by weight (phr) of water and an effective amount, ranging up to about 10 phr, of yeast, based on 100 parts by weight of bread mix. A typical dough mix would contain, at least initially, 60 phr of water and 5 phr of yeast.

A distinguishing characteristic of French-type bread mixes preferred for use in this invention is the relatively high protein content of the flour. For baked goods having a relatively soft texture (e.g. cakes), a relatively low protein flour can be used. As low as 10% by weight of protein, based upon the weight of the flour including moisture would be a typical protein content for flour used in baking soft cakes and the like. So-called family flour is somewhat higher in protein, e.g. 11 to 12% by weight (same basis). A French-type bread mix is normally higher in protein than family flour, and about 12% by weight of protein (same basis) would ordinarily be the bare minimum of protein content for French bread flour-at least about 13 weight-% would be more preferable. This higher protein content helps to impart the typical tough texture of French bread. Extensive experience with various French-type bread mixes and modification of these mixes indicates that a protein content above 15 weight-%, on the basis previously specified, is unnecessary. The optimum protein content appears to be about $13\frac{1}{2}$ to about $14\frac{3}{4}$%. A flour can be brought to a reasonably uniform protein content within the limits specified through careful selection and thorough blending of wheat. The hard spring wheats tend to have a higher protein content than the softer wheats. Thus, selecting hard spring wheat in the manner known in the art for providing high protein flour will provide a better starting material for the bread mixes used in this invention. There are a number of well-established tests, not only for protein content, but also for protein quality. These tests can be used to provide reasonably accurate quality control with respect to the flour.

It is particularly desirable to start the formulation of the bread mix with a blend of hard spring wheat flour and malted barley flour. The usual enrichment can be added to the flour, e.g. vitamins and minerals such as B vitamins and iron. Bromate salts such as potassium bromate can be added in the conventional manner. Other conventional additives preferably included in the bread mix are salt, sugar, various dough conditioners, vegetable oil, and any appropriate food preservatives, including those of the hindered phenol type (butylated hydroxytoluene, butylated hydroxyanisole, etc.). Dough conditioning effects can be provided with whey solids, corn flour, phosphates, amino acids, various inorganic salts, and the like. It is preferred that the functional additives conventionally used to produce a crusty French bread mix be eliminated from the formulation. Dough conditioning and softening can be provided by specialty emulsifiers derived from vegetable sources, i.e. mono- and diglycerides incorporated into the lipid system of the French bread mix. The flour or bread mix can be further fortified with gluten, if desired. Gluten is the protein substance of wheat which is intermixed with the starchy endosperm of the grain. Addition of gluten is a convenient means for increasing the protein content of the mix.

So long as the interior filling material is in an essentially frozen state (at a temperature below 0° C.) during the food item assembly operations and the beginning of the proofing step, the other aspects of preparation of the filling material can be varied to a considerable degree and the filling material can be molded, die cut from a sheet, etc.; however, one particular type of preliminary preparation has significant advantages. In this procedure, the filling material (which may, if desired, be easily deformable or even semi-liquid at 20°–25° C.) is stuffed into a casing in a manner similar to the manufacture of sausage or bologna or wurst, particularly the types of log-like sausage shapes having a diameter ranging from about 5 to about 15 centimeters. (Ideally, the diameter of the stuffed casing should be just slightly less than the diameter of the fully assembled sandwich item, hence about 8 to about 13 centimeters in diameter.) One difference from sausage or wurst or bologna manufacture, however, is that the casing is intended to be temporary and used during manufacture only; it is peeled off prior to the food item assembly operation. The sausage-like "logs" are placed in a freezing environment having an ambient temperature below 0° C. for several hours, so that the "logs" themselves are generally brought down to this ambient temperature. After freezing for, say, eight to 12 hours, the casing is peeled off of the frozen "logs", and the logs are then cut or sawed into disc-like elements, typically less than 5 centimeters in thickness, e.g. 0.5–2.5 cm. Although a generally circular periphery is most convenient for the resulting disc-like elements, oval or square or other non-circular shapes can also be appropriate, particularly if the assembled sandwich-like item has a non-circular periphery. The disc-like elements or slices from the frozen "log" can be used immediately in assembly of the food item; if immediate assembly is not contemplated, it is preferred to store the elements or slices of interior filling material in a freezer to retain the frozen state. If the meat used in the interior filling is desirably smoked, a particularly convenient time for the smokehouse treatment is subsequent to the formation of the stuffed casing (the "log") and prior to freezing and slicing.

As will be apparent from the foregoing description, other pre-sized layers of filling material can be used in place of the disc-like elements described previously, including slices from a solid block of cheese, patties made by a patty-forming machine, etc.

In the method of this invention, the dough is sheeted out to a thin (e.g. less than 5 mm) layer, more or less in the manner of pastry sheeting rather than conventional loaf formation. A conventional sheeter and cutter can be used for this purpose. The fresh dough (preferably after a short rest period) is sheeted out through sheeting rolls until the dough is thin enough to produce suitable dough pieces with a dough cutter having the desired shape (preferably substantially circular). Typical dough pieces produced in this manner have a weight ranging from 10 to 100 grams and a diameter greater than 5 centimeters but ordinarily less than about 15 centimeters. The thickness of the dough pieces should be adequate to give the resulting food item structural integrity, e.g. more than 1 millimeter and ranging up to a centimeter or two in thickness. Dough scraps can be added to fresh dough batches and sent through the sheeter again with the fresh batch. The aforementioned dimensions are particularly appropriate when the dough envelope is formed from a top sheet and a bottom sheet, the top and bottom sheets typically being crimped together at the periphery of the assembled food item. To form a dough envelope from a single dough sheet, of course, requires a much larger sheet—typically more than double the area dimensions described previously. Experience indicates that the top-and-bottom sheet approach, with crimping, virtually eliminates any dough scraps in the later stages of the assembly procedure. In the crimping technique, it is preferable that one of the two dough pieces or sheets (i.e. either the top or bottom piece) be larger than the other. Ordinarily, the bottom sheet will be larger, and thus can be even larger than 15 cm in diameter for larger sandwich-like items. For example, the botton dough sheet could be up to 20 cm in diameter.

If the interior filling material has not yet been frozen, it is brought down to a temperature below 0° C. prior to being inserted into the dough envelope. The preferred technique for totally enveloping the frozen pre-sized layer in the dough envelope is to place the cold interior filling on the bottom sheet, cover the top of the cold filling with the top sheet, and then crimp or otherwise join the peripheries of the top and bottom sheets. During this assembly procedure, the dough sheets are not frozen and are typically at normal ambient temperatures, e.g. 20°–25° C. The difference in temperatures between the filling material and the dough sheets in deliberate. The assembled, sandwich-like item is proofed and baked to convert the dough into a French-bread-like material, and it has been found to be desirable that the proofing and baking conditions have very little effect upon the internal temperature of the filling material. Under virtually any effective baking conditions, there can be at least some effect upon the temperature of the filling material; however, the very low interior temperature of the sandwich-like filling material minimizes this effect.

The proofing and baking conditions are selected with a view toward the nature of the dough mix. Proofing is essentially a process for activating the yeast in the dough. Yeast activation conditions involve moderately elevated temperatures and a high relative humidity, e.g. 60–100%. It is not ordinarily desirable to permit the relative humidity to reach 100%, however, and the ambient relative humidity in the proofing zone or "proof box" is ordinarily about 85–95% for the French bread-type dough mix used in this invention. To fully activate the yeast, the ambient temperature in the "proof box" should be above room temperature (e.g. greater than 30° C.), but cool enough such that the temperature of the dough itself does not exceed 50° C., at least until baking of the dough begins. Many varieties of yeast will not survive a temperature above 50° C. for any substantial length of time. If the yeast were killed during the proofing step, of course, little or no carbon dioxide would be produced during baking, and the objectives of proofing and baking would be at least partially defeated.

The ambient temperature in the proofing zone can be higher than 45° C. or even higher than 50° C., because of the time lag during which the interior temperature of the dough is equilibrating with the ambient temperature. For example, a "proof box" temperature up to about 75° C. would require a short, but significant interval of time to bring the dough envelope up to a temperature as high as 50° C. Furthermore, the temperature in the "proof box" tends to drop from its initial reading during the proofing step. Proofing requires several minutes, but typically less than an hour, e.g. 10–30 minutes. For an initial proof box ambient temperature of, say, 65° C., one will normally observe a drop to 45° or 50° C. in 15 to 20 minutes. During this period of time, the interior temperature of the dough itself is not likely to rise significantly above 40° C. and may even stay well below 35° C. By utilizing ambient relative humidity below 100%, as described previously, residual wetness in the dough can be avoided. Although a relative humidity above 80% is preferred, as low as 60% can be used. Just as the ambient temperature drops during proofing, a drop in the relative humidity down to as low as, for example, 58% can be observed during proofing.

The proofed food items, which now have the desired dough texture, can be baked in a generally conventional manner in conventional baking ovens. A slight degree of baking may occur during the proofing step; however, this is not necessary, and all or substantially all of the baking may occur in the baking oven. The baking oven is preferably preheated to a temperature in excess of 150° C., e.g. 200°–250° C. Baking also takes less than an hour, e.g. 10–30 minutes. After baking, which turns the dough into bread but has very little effect upon the interior filling material, the sandwich-like items are permitted to cool, and most effective marketing techniques call for freezing of the food items in addition to cooling them, so that they can be shipped and stored in the frozen condition. Typical freezing conditions for the assembled food items involve temperatures below 0° C., e.g. −10° to −20° C.

A typical fully assembled sandwich-like food item made according to this invention weighs from 100 to 250 grams and has a diameter ranging from 10 to 15 centimeters.

In the preferred method of distributing food items made according to this invention, the items are delivered to food stores or fast food outlets or restaurants in the frozen state and kept in the freezer at the point of use or sale. Prior to use, they are removed from the freezer and placed under refrigeration for tempering. (Typical ambient refrigeration temperatures range from 2° to 15° C.) It is ordinarily preferred to continue the storage under refrigeration for several hours, e.g. 8–24 hours, and this time may or may not be shortened by leaving the items exposed to room temperature or by using microwave energy to defrost them. Once the food items have reached the desired refrigeration temperature and are thus partially or fully thawed, they are ordinarily not refrozen and ordinarily not stored, even under refrigeration, for more than a few days.

Microwave reconstitution is accomplished by placing the food item on a paper plate or other suitable substrate and then inserted in roughly the center of the microwave chamber or oven or cavity. Ordinary kitchen-size microwave ovens can be used, in which case it is preferred to reconstitute only one food item at a time. The period for exposure to microwave energy can range from a few seconds to a few minutes, the optimum time being 30–120 seconds, e.g. 75 seconds. If two food items are to be prepared at the same time, a longer microwave heating cycle is preferred, e.g. 120–180 seconds. Thus, a microwave heating cycle of 30–120 seconds per food item provides a good rule of thumb, the exact heating time being determined by the starting temperature of the item. After the period of exposure to microwave energy has expired, the food item is essentially ready for consumption.

If the sandwich-like food item is defrosted at room temperature rather than under refrigeration, the preferred defrosting time is less than eight hours, e.g. four hours. The food item should be unwrapped and generally exposed to the ambient temperature during defrosting; however, a layer of polymeric film can be left on the item during defrosting.

Suitable microwave ovens are commercially available. These ovens typically provide energy in the 800–10,000 megahertz range.

If the food item is reconstituted directly from the deep frozen state, some adverse effects upon the quality of the item may be observed; however, such adverse effects are believed to be surprisingly small in view of experience with conventional sandwich items. Microwaving exposure times for heating from the deep frozen state are typically longer than 75 seconds per item but still reasonably brief.

If desired, improved moisture retention in food item during reconstitution directly from frozen state can be accomplished by encasing the food item in a container or package such as a small plastic box (small enough to fit easily in a microwave oven) which blocks egress of water vapor but is reasonably transparent to microwave radiation.

We claim:

1. A method for making a sandwich-like convenience food comprising:
   (a) forming a dough sheet at normal ambient temperatures;
   (b) freezing a pre-sized layer of interior filling material to a temperature below 0° C.;
   (c) inserting the said pre-sized layer, frozen according to step (b), upon a said dough sheet, said dough sheet being then maintained at a non-freezing temperature above 0° C., and totally eveloping the frozen pre-sized layer in the non-frozen dough sheet, thereby obtaining an assembled, sandwich-like convenience food item;
   (d) proofing and baking the said assembled, sandwich-like convenience food item, said proofing being carried out under ambient yeast-activating conditions;
   (e) bringing said convenience food item to a temperature above 25° C. by adsorption of microwave energy in a microwave oven zone.

2. A method according to claim 1 wherein said ambient yeast-activating conditions are as follows:
   relative humidity: greater than 60%
   temperature: greater than 30° C., but cool enough such that the temperature of the said dough sheet does not exceed 50° C. during said proofing.

3. A method according to claim 2 in which said ambient relative humidity is about 85–95% and said ambient temperature is about 45° to about 75° C.

4. A method according to claim 1 in which said dough sheet comprises:
   (a) an enriched, bromated, bleached flour containing malted barley flour, and flour from spring wheat having a protein content averaging above about 12 but less than about 15% by weight, based on the weight of the flour including moisture;
   (b) yeast; and
   (c) a suitable dough conditioner.

5. a method according to claim 1 wherein the said assembled, sandwich-like convenience food item, subsequent to said proofing and baking, is frozen at an ambient freezing temperature below 0° C.

6. A method according to claim 1 wherein the said dough sheet is cut into top and bottom sheets, said enveloping being carried out by placing the said pre-sized layer on said bottom sheet, placing said top sheet on top of said pre-sized layer, and peripherally joining said top sheet and said bottom sheet.

7. A method according to claim 6 wherein said joining is carried out by crimping.

8. A method according to claim 6 wherein said pre-sized layer has been sliced from a frozen filling material encased within a generally cylindrical casing.

9. A method for making a sandwich-like convenience food comprising:
   (a) forming, at normal ambient temperatures, a generally flat dough sheet less than about 2 cm thick from a dough comprising:
      (1) an enriched, bromated, bleached flour containing malted barley flour, and flour from spring wheat having a protein content averaging about 13 to about 15% by weight, based on the weight of the flour including moisture;
      (2) yeast; and
      (3) a suitable dough conditioner;
   (b) forming a generally disc-like sandwich filling material and freezing said disc-like sandwich filling material to a temperature below 0° C.;
   (c) cutting a top and a bottom sheet element from said generally flat dough sheet;

(d) inserting said frozen, disc-like sandwich filling material between said top and bottom sheet elements and peripherally joining said top and bottom sheet elements to totally envelop said frozen, disc-like sandwich filling material within the non-frozen top and bottom sheet elements, thereby obtaining an assembled, sandwich-like convenience food item;

(e) proofing the said assembled, sandwich-like convenience food item in a proofing zone at an ambient relative humidity of about 85–95% and an ambient temperature of about 45°–75° C.;

(f) baking said food item at ambient baking temperatures above 150° C.; and (g) bringing said food item to a temperature about 25° C. by adsorption of microwave energy in a microwave oven zone.

10. A sandwich-like convenience food made according to claim 1.

11. A method according to claim 9 in which said step (b) is completed prior to said step (a).

12. A method according to claim 9 wherein the said assembled, sandwich-like convenience food item, subsequent to said step (f) but prior to said step (g), is frozen at an ambient freezing temperature below 0° C.

13. A method according to claim 1 wherein the said convenience food item, subsequent to said step (d) but prior to said step (e), is frozen at an ambient freezing temperature below 0° C.

* * * * *

UNITED STATES PATENT AND TRADEMARK OFFICE
CERTIFICATE OF CORRECTION

PATENT NO. : 4,207,348

DATED : June 10, 1980

INVENTOR(S) : Barry L. Vermilyea, Fred W. Crossen, Jr., Douglas D. Mohar

It is certified that error appears in the above-identified patent and that said Letters Patent are hereby corrected as shown below:

Column 1, line 31, for "operation" read --operations--.
Column 3, line 33, for "sauses" read --sauces--.
Column 5, line 67, for "in" read --is--.
Column 8, line 8, for "eveloping" read --enveloping--.

Signed and Sealed this

Ninth Day of December 1980

[SEAL]

Attest:

SIDNEY A. DIAMOND

*Attesting Officer*   *Commissioner of Patents and Trademarks*